United States Patent [19]

Rehmer et al.

[11] Patent Number: 5,162,415

[45] Date of Patent: Nov. 10, 1992

[54] AQUEOUS SYNTHETIC RESIN FORMULATIONS

[75] Inventors: Gerd Rehmer, Beindersheim; Maria G. Rau; Eckehardt Wistuba, both of Bad Durkheim; Reinhard Baecher, Frankenthal; Lothar Matthaei, Weisenheim, all of Fed. Rep. of Germany

[73] Assignee: BASF Aktiengesellschaft, Ludwigshafen, Fed. Rep. of Germany

[21] Appl. No.: 583,847

[22] Filed: Sep. 13, 1990

[30] Foreign Application Priority Data

Sep. 13, 1989 [DE] Fed. Rep. of Germany ....... 3930585

[51] Int. Cl.$^5$ .......................... C08K 5/07; C08K 5/04; C08K 3/26
[52] U.S. Cl. .................................. 524/359; 524/399; 524/400; 524/427
[58] Field of Search ................ 524/359, 399, 400, 427

[56] References Cited

U.S. PATENT DOCUMENTS 5,049,597  9/1991  Howard, Jr. ........................ 524/427

FOREIGN PATENT DOCUMENTS 0010000  4/1980  European Pat. Off.
1720603  6/1970  Fed. Rep. of Germany
3800984  7/1989  Fed. Rep. of Germany
1573343  5/1969  France

*Primary Examiner*—Kriellion S. Morgan

*Attorney, Agent, or Firm*—Oblon, Spivak, McClelland, Maier & Neustadt

[57] ABSTRACT

Aqueous synthetic resin formulations essentially contain

A) from 3 to 75% by weight of one or more synthetic resins which are composed of
  a) from 50 to 99.9% by weight of one or more unsaturated carboxylic or vinyl esters,
  b) from 0.1 to 12% by weight of one or more $\alpha,\beta$-monoethylenically unsaturated monobasic or dibasic acids or their ahydrides,
  c) from 0 to 10% by weight of one or more monoethylenically unsaturated acetophenone or benzophenone derivatives,
  d) from 0 to 35% by weight of one or more other copolymerizable monoethylenically unsaturated monomers, in polymerized form, B) one or more metal cations having a charge of from 2 to 4, in water-soluble form, C) from 0 to 10% by weight, based on the synthetic resin A, or benezophenones or acetophenones which are not monoethylenically unsaturated, D) effective amounts of emulsifiers or protective colloids or a mixture of these active ingredients, E) not less than 5% by weight of water and F) from 0 to 85% by weight of finely divided fillers, and the total amount of the cations B is such that it is capable of neutralizing from 0.2 to 6 times the amount, corresponding to the amount of acid functions incorporated in the form of the monomers b in the synthetic resin A, of their conjugated bases.

These synthetic resin formulations are suitable for coating, adhesive bonding, sealing or impregnating.

9 Claims, No Drawings

AQUEOUS SYNTHETIC RESIN FORMULATIONS

The present invention relates to aqueous synthetic resin formulations, essentially containing A) from 3 to 75% by weight of one or more synthetic resins which are composed of
  a) from 50 to 99.9% by weight of one or more esters of $\alpha,\beta$-monoethylenically unsaturated carboxylic acids of 3 to 6 carbon atoms and alkanols of 1 to 18 carbon atoms or one or more vinyl esters of an aliphatic monocarboxylic acid of 2 to 8 carbon atoms or of a mixture of these monomers (monomers a),
  b) from 0.1 to 12% by weight of one or more $\alpha,\beta$-monoethylenically unsaturated monobasic or dibasic acids of 3 to 8 carbon atoms, of their . anhydrides or of a mixture of these monomers (monomers b),
  c) from 0 to 10% by weight of one or more monoethylenically unsaturated acetophenone or benzophenone derivatives or of a mixture of these monomers (monomers c) and
  d) from 0 to 35% by weight of one or more other copolymerizable monoethylenically unsaturated monomers (monomers d), in polymerized form,
  the weights of monomers a, b and d being chosen within the stated limits in such a way that a synthetic resin consisting only of these monomers would have a glass transition temperature of from 40° to $-50°$ C.,
B) one or more metal cations having a charge of from 2 to 4, in water-soluble form,
C) from 0 to 10% by weight, based on the synthetic resin A, of benzophenone or acetophenone or of one or more acetophenone or benzophenone derivatives which are not monoethylenically unsaturated or of a mixture of these active ingredients,
D) effective amounts of emulsifiers or protective colloids or a mixture of these active ingredients,
E) not less than 5% by weight of water
F) from 0 to 85% by weight of finely divided fillers, with the proviso that the total amount of the monomers c and of component C is from 0.05 to 10% by weight, based on the synthetic resin A, and the total amount of the cations B is such that it is capable of neutralizing from 0.2 to 6 times the amount, corresponding to the amount of acid functions incorporated in the form of the monomers b in the synthetic resin A, of their conjugated bases. The present invention furthermore relates to the preparation of these aqueous synthetic resin formulations and their use as materials for coating, adhesive bonding, sealing or impregnation.

DE-A 17 20 603 relates to aqueous synthetic resin dispersions whose synthetic resins contain, as polymerized units, not only monomers such as acrylates and methacrylates, styrene, acrylonitrile and vinyl esters but also monoethylenically unsaturated acetophenone and/or benzophenone derivatives, and which are obtained in the presence of nonionic emulsifiers, such as

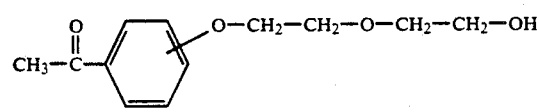

by free radical emulsion polymerization. These synthetic resin dispersions are recommended as pigment binders, for film and paper coating and for the preparation of selfshine emulsions and textile seasonings. However, the resilience of these binders in the solidified state is not completely satisfactory.

EP-B 10000 relates to compositions which contain
a) from 10 to 90% by weight, based on solids, of a polymeric binder and
b) from 90 to 10% by weight, based on the solids, of one or more additives, such as dispersants, fillers, etc., the polymeric binder being an addition polymer with a skeleton of copolymerized, ethylenically unsaturated monomers, one of which is an unsaturated carboxylic acid monomer, some of which may be modified by attached groups consisting of ester amide and ester groups, and the glass transition temperature of the skeleton polymer free of attached ester amide or ester groups being less than 0° C., wherein the composition contains from 0.01 to 1% by weight, based on the weight of the polymer solids, of benzophenone or a benzophenone derivative which is not monoethylenically unsaturated. If the addition polymers contain carboxylic acid monomers which have been modified by reaction with an unsaturated fatty acid hydroxyamide or with an unsaturated fatty acid glycidyl ester, these compositions may contain small amounts of drying agents, such as zinc salts of naphthenic acids, as additives. The stated compositions are recommended for filling, calking, sealing and/or adhesive bonding, and, under the action of actinic radiation, their surface tack decreases relatively rapidly, reducing the tendency to soil. However, the disadvantage of these compositions is that the resilience in the solidified state, in particular at elevated temperatures, is not completely satisfactory and furthermore the embodiments which contain addition polymers of carboxylic acid monomers modified with unsaturated ester amide or unsaturated ester groups cannot be prepared in a simple manner.

Unsatisfactory resilience in the solidified state is a disadvantage, for example, when the compositions are to be used outdoors for coating surfaces containing cracks, since the external temperature changes cause fluctuations in the expansion of the cracks, which usually leads to fracture of the coating in the course of time if the coating does not have sufficient resilience.

DE-A 3 800 984 relates to binders for nontacky, nonsoiling, resilient coatings based on aqueous copolymer dispersions which contain zinc amine complex salts, wherein the said binders essentially consist of
a) from 99 to 90% by weight of a (meth)acrylate copolymer dispersion whose polymer has a glass transition temperature of from $-40°$ to $-1°$ C. and
b) from 1 to 10% by weight of a water-soluble zinc amine complex of a polymeric carboxylic acid, the percentages by weight being based on the total amount of polymer The disadvantage of these binders is that, in particular when they are used outdoors, the surface tack of the resulting coatings, and consequently their tendency to soil, are not completely satisfactory.

It is an object of the present invention to overcome the disadvantages described by means of more suitable compositions.

We have found that this object is achieved by the synthetic resin formulations defined at the outset.

Particularly suitable monomers a are the esters of acrylic and methacrylic acid. The esters of methanol, of ethanol, of the propanols, of the butanols, of the pentanols, of 2-ethylhexanol, of isooctanol, of n-decanol and of n-dodecanol are particularly important. Particularly suitable vinyl esters are vinyl formate, vinyl acetate, vinyl propionate and vinyl butyrate, among which vinyl propionate is particularly preferred. Preferred monomers b are α,β-monoethylenically unsaturated mono- or dicarboxylic acids, such as acrylic acid, methacrylic acid, ethacrylic acid, itaconic acid, fumaric acid and maleic acid, and anhydrides thereof. Other suitable monomers b are the semiamides of dicarboxylic acids, such as maleic, fumaric and itaconic acid, and the half-esters of these α,β-monoethylenically unsaturated dicarboxylic acids with alkanols of 1 to 18 carbon atoms. Vinylsulfonic acid, vinylphosphonic acid, acrylamidoglycolic acid and methacrylamidoglycolic acid are also suitable as monomers b. The synthetic resins A advantageously contain from >1 to 6% by weight of the monomers b as polymerized units.

Preferred monomers c are monoethylenically unsaturated acetophenone and benzophenone derivatives which have neither a phenyl group having a free hydroxyl group in the ortho-position to the carbonyl group of the phenone parent substance nor a phenyl group having a free amino group in the ortho- or para-position to the carbonyl group of the phenone parent substance. Suitable monomers of this type are, in particular, compounds of the general formula I

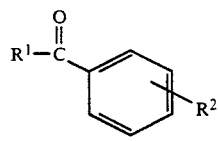

(I)

where $R^1$ is —CH$_3$ or —C$_6$H$_5$, $R^2$ is

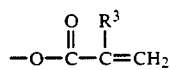

and $R^3$ is —H or —CH$_3$. Preferred compounds I are those in which $R^1$ is phenyl and $R^2$ is in the para-position to the carbonyl group of the phenone parent substance.

Other suitable monomers c are compounds of the general formula II

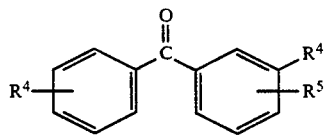

(II)

where $R^4$ is —H or —C$_n$H$_{2n+1}$ in which n is from 1 to 4, $R^5$ is —O—$R^6$ or

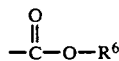

and $R^6$ is

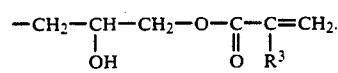

Preferably used compounds II are those in which $R^5$ is an ester group and is in the para-position to the carbonyl group of the phenone parent substance. Further suitable monomers c are compounds of the general formula III

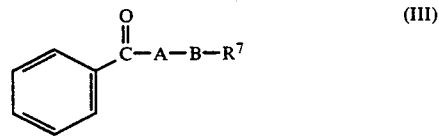

(III)

and compounds of the general formula IV

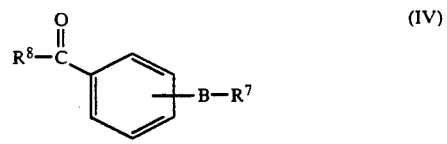

(IV)

where $R^7$ is

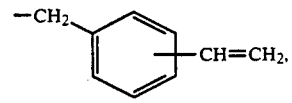

$R^8$ is —C$_n$H$_{2n+1}$ in which n is from 1 to 3 or —C$_6$H$_5$,
A is a saturated or unsaturated hydrocarbon chain which may be branched and is of 1 to 3 carbon atoms or a hydrocarbon ring of 3 to 6 carbon atoms,
B is —O—,

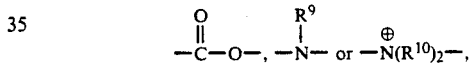

$R^9$ is —H or —C$_n$H$_{2n+1}$ in which n is from 1 to 8 and $R^{10}$ is —C$_n$H$_{2n+1}$ in which n is from 1 to 4.

Furthermore, particularly suitable monomers c are compounds of the general formula V

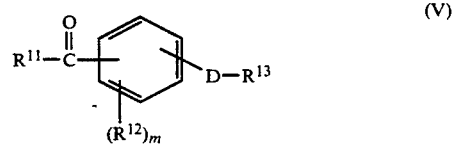

(V)

where
$R^{11}$ is lower alkyl or phenyl and the hydrogen atoms of the phenyl group may be monosubstituted or polysubstituted by halogen, lower alkoxy or hydroxyl, with the proviso that a hydrogen atom, of the phenyl group, which is in the ortho-position to the carbonyl group of the phenone parent substance is not replaced by hydroxyl, $R^{12}$ is halogen, lower alkoxy and/or hydroxyl, with the proviso that, in the case of hydroxyl, $R^{12}$ is not in the ortho-position to the carbonyl group of the phenone parent substance,
m is from 0 to 4,
D is —O—,

an oxyalkyleneoxy chain, a carbamoylalkyleneoxy chain or an alkyleneoxy chain and $R^{13}$ is alkenyl or ω-carboxyalkenyl.

Compounds of the general formula VI

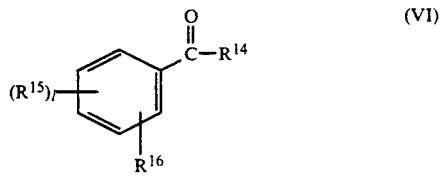   (VI)

where
$R^{14}$ is $R^8$ or phenyl in which up to 1 hydrogen atoms may be replaced by $R^{15}$,
l is from 0 to 4,
$R^{15}$ is —H, —CF$_3$, —O-alkyl and/or alkyl-COO—, where alkyl in each case is of 1 to 4 carbon atoms, halogen, —CN, —COOH or an —OH group which is not in the ortho-position to the carbonyl group of the phenone parent substance, $R^{16}$ is a group of the general formula VII

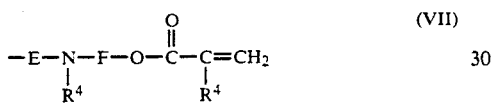   (VII)

where
E is

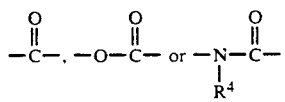

and
F is a hydrocarbon chain of 2 to 12 carbon atoms, which may be interrupted by one or more oxygen atoms, are also particularly advantageously incorporated as monomers c. Preferred compounds VI are the acrylates and methacrylates of the alcohol of the following structure

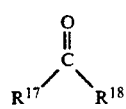

However, very particularly preferred monomers c are compounds of the general formula VIII

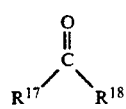   VIII where
$R^{17}$ is linear alkyl group of 1 to 3 carbon atoms, alkyl of 3 or 4 carbon atoms, one or more of whose hydrogen atoms may be replaced by halogen atoms, or is aryl or $R^{18}$,
$R^{18}$ is

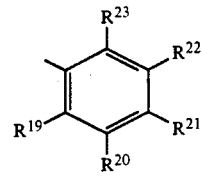

$R^{19}$ to $R^{23}$ independently of one another are each $R^4$, —OH (which must not be in the ortho-position to the carbonyl group of the phenone parent substance), —OCH$_3$, —OC$_2$H$_5$, —SH, —SCH$_3$, —Cl, —F, —CN, —COOH, —COO-alkyl, where alkyl is of 1 to 3 carbon atoms, —CF$_3$, —N(CH$_3$)$_2$, —N(C$_2$H$_5$)$_2$, —N—(CH$_3$)C$_6$H$_5$, —N⊕(CH$_3$)$_3$X$^-$, —N⊕(CH$_3$)$_2$X$^-$, where X$^-$ is an acid anion, such as Cl⊖, Br⊖, CH$_3$COO⊖, HSO$_4$⊖, H$_2$PO$_4$⊖ or NO$_3$⊖, with the proviso that one or more of the radicals $R^{19}$ to $R^{23}$ is a radical of the general formula IX

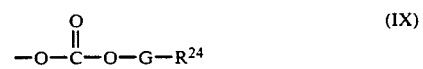   (IX)

where
$R^{24}$ is

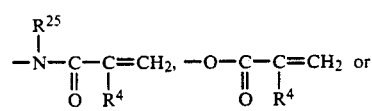

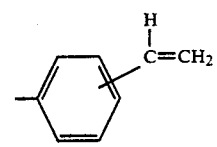

$R^{25}$ is $R^1$ or $R^4$,
G is —{—(K)$_i$—J—}$_j$—(K)$_k$— and/or —{—(K)$_i$—J—}$_j$—(K)$_k$—J—}$_h$—
K is an alkylene group, one or more of whose hydrogen atoms may be replaced by halogen atoms, or is cycloalkylene of 5 to 10 carbon atoms or phenylene,
J is —O—, —S—,

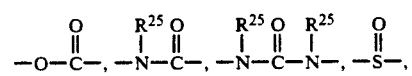

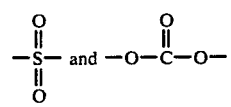

i and k are each from 1 to 10 and
j and h are each from 0 to 25,
preferred monomers among the compounds VIII being

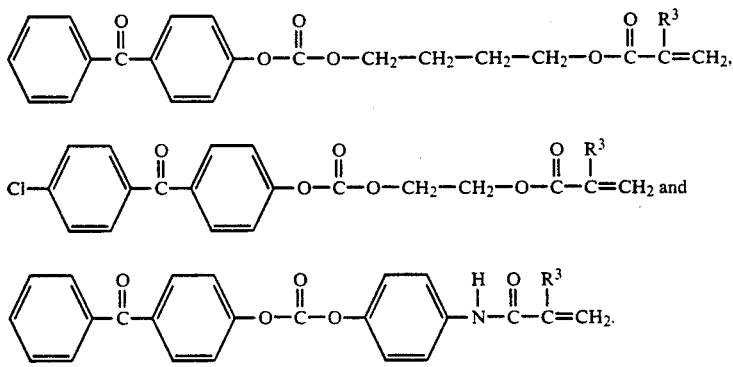

Finally, another preferred monomer c is α,ω-acryloylbutylene-(4,4′-benzoylphenyl) carbonate. The compounds of the general formulae I to VI and of the general formula VIII are known and are described, for example, in U.S. Pat. No. 3,214,492 (compounds I), U.S. Pat. No. 3,429,852 (compounds II), DE-A 28 18 763 (compounds III and IV), EP-A 246 848 (compounds V), the prior publication P 38 20 463.0 (compounds VI) and the prior publication P 38 44 44.5 (compounds VIII). The synthetic resins A preferably contain from 0.1 to 2% by weight of the monomers c as polymerized units.

Possible monomers d include monoethylenically unsaturated nitrogen compounds which do not contain any carboxyl groups, such as acrylamide, methacrylamide, N-vinylformamide, N-vinylpyrrolidone, the amides of acrylic or methacrylic acid and tetrahydrofurfurylamine, acrylonitrile and methacrylonitrile and ureido monomers, such as β-ureidoethyl acrylate, β-ureidoethyl vinyl ether, N-dimethylaminoethyl-N′-vinyl-N,N′-ethyleneurea and N-methacrylamidomethyl-N,N′-ethyleneurea.

Other suitable monomers d are acrylates or methacrylates of diols, eg. 2-hydroxyethyl acrylate or 1,4-butanediol monoacrylate, and of tetrahydrofurfuryl alcohol, vinylaromatic monomers, such as styrene or vinyltoluene, halogen-containing vinyl monomers, such as vinyl chloride and vinylidene chloride, unsaturated hydrocarbons, such as ethylene, propylene, isobutene, butadiene and isoprene, and lower vinyl ethers. The polyunsaturated monomers d, eg. butadiene, are preferably used in amounts of less than 5% by weight. Preferred monomers d are those, such as tetrahydrofurfur-2-yl methacrylate or tetrahydrofurfur-2-ylacrylamide, which contain ether, ketal, acetal, aminal, semiaminal or thioacetal groups, ether groups being particularly advantageous. The weight of such monomers in the synthetic resins A should as a rule be less than 20% by weight. Silicon-containing monomers, such as vinyltriethoxysilane, 8-methacryloxypropyltrimethoxysilane or vinyltris-2-methoxysilane, are also advantageously present as polymerized monomers d in minor amounts, ie. from 0.01 to 0.5% by weight, based on the synthetic resin A. Compounds which improve wet adhesion, such as 1-(methacryloxyethyl)imidazolidin-2-one, are also suitable as monomers d.

Of particular interest are synthetic resins A whose monomer components a, b and d are such that a synthetic resin composed only of the monomers a, b and d would have a glass transition temperature of from −30° to −10° C. According to Fox (T. G. Fox, Bull. Am. Phys. Soc. (Ser. II) 1 (1956), 123), the following is a good approximation for the glass transition temperature of copolymers:

$$\frac{1}{Tg} = \frac{X^1}{Tg^1} + \frac{X^2}{Tg^2} + \ldots \frac{X^s}{Tg^s}$$

where $X^1, X^2, \ldots, X^s$ are the mass fractions of the monomers $1, 2, \ldots, s$ and $Tg^1, Tg^2, \ldots Tg^s$ are the glass transition temperatures of the polymers composed only of one of the monomers $1, 2, \ldots$ or s, in degrees Kelvin. The glass transition temperatures of the monomers a, b and d are essentially known and are listed in, for example, J. Brandrup and E. H. Immergut, Polymer Handbook 1st Ed. J. Wiley, New York 1966 and 2nd Ed. J. Wiley, New York 1975.

The polymers to be used as synthetic resins A are in principle obtainable by known methods of free radical mass, solution, suspension and emulsion polymerization. However, since the preferred embodiment of the novel aqueous synthetic resin formulations is the aqueous dispersion, it is also advisable to use the synthetic resin A in this form, and accordingly it is preferably prepared by polymerization of the particular monomers in an aqueous medium under the known conditions of free radical emulsion polymerization in the presence of water-soluble free radical initiators and emulsifiers D and in the presence or absence of protective colloids D and regulators as well as further assistants.

Both nonionic and anionic surfactants have proven useful as emulsifiers D. Preferably used nonionic surfactants are ethoxylated alkanols having a degree of ethoxylation of from 2 to 100 and containing a $C_8$–$C_{36}$-alkyl radical, ethoxylated mono-, di- or trialkylphenols or -naphthols having a degree of ethoxylation of from 2 to 100 and containing a $C_4$–$C_{36}$-alkyl radical, and ethoxylated aliphatic monocarboxylic acids having a degree of ethoxylation of from 6 to 50 and containing a $C_8$–$C_{24}$-alkyl radical.

Particularly preferred nonionic emulsifiers are those of the general formula X

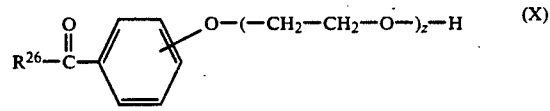

where Z is from 1 to 200 and $R^{26}$ is $R^1$ or phenyl which is substituted by straight-chain or branched alkyl of 1 to 18 carbon atoms.

Advantageously used anionic surfactants are the alkali metal salts of the sulfated derivatives of alkanols of 6 to 18 carbon atoms, ethoxylated alkanols having a degree of ethoxylation of from 4 to 30 and containing a $C_{12}$–$C_{18}$-alkyl radical and of ethoxylated alkylphenols having a degree of ethoxylation of from 4 to 30, the alkali metal and ammonium salts of higher fatty acids and the alkali metal salts of alkylsulfonic acids of 12 to 18 carbon atoms. The alkali metal salts of alkylarylsulfonic acids and of disulfonated alkyldiphenol oxides containing a $C_{10}$–$C_{18}$-alkyl radical are also suitable. Examples of suitable protective colloids D are high molecular weight compounds, such as polyvinyl alcohols, polyvinylpyrrolidones, cellulose derivatives, polyacrylamides, polymethacrylamides, polycarboxylic acids or their alkali metal or ammonium salts. The number average molecular weight $\overline{M}_n$ of these protective colloids is preferably from $2 \cdot 10^4$ to $10^5$.

Particularly suitable polymerization initiators are inorganic peroxides, such as hydrogen peroxide or alkali metal peroxydisulfates. Also suitable are azo compounds, such as 2,2'-azobisisobutyronitrile, 2,2'-azobis-(methyl isobutyrate), 2,2'-azobis-(2,4-dimethylvaleronitrile), 2,2'-azobis-(4-methoxy-2,4-dimethylvaleronitrile), 2,2'-azobis-(N,N'-dimethyleneisobutyramidine) dihydrochloride, 2,2'-azobis-(2-amidinopropane) . dihydrochloride or 4,4'-azobis-(4-cyanovaleric acid), organic acyl peroxides, such as dibenzoyl peroxide, dilauroyl peroxide, didecanoyl peroxide and diisononanoyl peroxide, alkyl peresters, such as tert-butyl perpivalate, tert-butyl per-2-ethylhexanoate, tert-butyl permaleate, tert-butyl peracetate and tert-butyl perbenzoate, hydroperoxides, such as tert-butyl hydroperoxide, combined systems which are composed of one or more organic reducing agents and one or more peroxides and/or hydroperoxides, for example tert-butyl hydroperoxide and the Na salt of hydroxymethanesulfinic acid, and combined systems which moreover contain a small amount of a metal compound which is soluble in the polymerization medium and whose metal component may occur in a plurality of valency states, for example ascorbic acid/iron(II) sulfate/sodium peroxydisulfate, the Na salt of hydroxymethanesulfinic acid, sodium sulfite, sodium bisulfite or sodium metabisulfite also frequently being used instead of ascorbic acid.

The emulsion polymerization temperature and the amount of polymerization initiators used are known and are such that a weight average molecular weight $\overline{M}_w$ of the dispersed synthetic resin A of from $5 \cdot 10^4$ to $2 \cdot 10^6$, preferably from $2 \cdot 10^5$ to $10^6$, is obtained. As a rule, the emulsion polymerization temperature is from 30° to 90° C., preferably from 45° to 85° C., and the polymerization initiators are usually used in amounts of from 0.1 to 10% by weight, based on the total amount of monomers. In order to adjust the molecular weight, molecular weight regulators may also be added, usually in amounts of from 0.1 to 5% by weight, based on the total amount of monomers, for example alcohols, such as butenediol or isopropanol, or mercapto compounds, such as mercaptosuccinic acid, or haloform compounds, such as bromoform or chloroform.

The amount of dispersants D, emulsifiers and/or protective colloids used essentially determines the mean diameters of the resulting dispersed synthetic resin particles and the stability of the dispersion. Usually, they are used in an amount of from 0.5 to 10% by weight, based on the total weight of the monomers.

The emulsion polymerization for the preparation of the synthetic resin A may be carried out both as a batch process and in the form of a feed process, including stages or a gradient procedure. The feed process, in which some of the polymerization batch is initially taken and heated to the polymerization temperature and the remainder is then introduced continuously, stepwise or with superposition of a concentration gradient, in separate feeds, one or more of which contain the monomers in pure or emulsified form, is preferred. The solids content of the resulting aqueous starting dispersions containing one or more synthetic resins A in dispersed form when dispersant D is used is preferably from 30 to 60, particularly preferably from 45 to 55, % by weight.

Particularly suitable starting elements for metal cations having a charge of from 2 to 4 (component B) are alkaline earth metals, aluminum, zinc, tin, cadmium, iron, cobalt, copper, nickel, titanium, manganese, vanadium and zirconium, among which zinc is very particularly preferred.

The cations B are introduced into the novel aqueous synthetic resin formulations in general by incorporating, for example stirring, a compound containing the metal component, in pure form or dissolved in a suitable solvent, for example water or a lower alcohol, into an aqueous starting dispersion containing one or more synthetic resins A, preferred compounds being those which have relatively good solubility in water. Examples of these are the salts of inorganic or organic acids, such as the formates, acetates, sulfates, sulfites, nitrates or hydroxides. However, the oxides, carbonates and -bicarbonates which have a lower solubility in water, are also suitable, particularly if they are incorporated into weakly acidic starting dispersions. In general, care should be taken to ensure that, on the one hand, the metal components are not precipitated by assistants added during the emulsion polymerization of A and, on the other hand, the addition of the metal component does not result in coagulation in the dispersion. In order to prevent precipitation of the metal component, complexing agents are preferably added. Examples of suitable complexing agents are alkali metal salts of oxalic acid, tartaric acid, citric acid, pyrophosphoric acid or ethylenediaminetetraacetic acid, amino acids, such as alanine, glycine, valine, norvaline, leucine, norleucine, N-methylaminoacetic acid, N-ethylaminoacetic acid or N-phenylaminoacetic acid, nicotinic acid or low molecular weight polyacrylic or polymethacrylic acid and very particularly preferably ammonia.

The cations are advantageously added in the form of salts of the abovementioned complex-forming acids (such as metal chelates). Other suitable metal chelates are metal acetylacetonates, such as Al(III) acetylacetonate, Cr(III) acetylacetonate, zinc(II) acetylacetonate or titanium(IV) acetylacetonate, and titanic(IV) esters, such as tetramethyl orthotitanate or tetraethyl orthotitanate. Zn(II) is preferably incorporated as aqueous ammoniacal Zn(II) ammonium bicarbonate solution. The addition of the metal component B in complexed form simultaneously reduces the tendency of the dispersion to coagulate. The latter can also be avoided in particular by using, preferably, nonionic emulsifiers or protective colloids for the preparation of the starting dispersion containing one or more synthetic resins A. Particularly preferred in this context are ethoxylated alkanols having a degree of ethoxylation of from 10 to 30 and containing a $C_8$–$C_{16}$-alkyl radical, ethoxylated monoalkylphenols having a degree of ethoxylation of from 10 to 30 and containing a linear $C_{12}$–$C_{18}$-alkyl radical and, as protective colloids, hydroxyethylcelluloses, polyvinyl alcohols or polyvinylpyrrolidones.

The preferably used amounts of these dispersants are from 2 to 4% by weight, based on the total amount of the monomers. Another, preferably used possible method for increasing the stability of the aqueous starting dispersions containing one or more synthetic resins A is to increase the pH of the dispersion medium to pH 6-12 by adding ammonia or amines, such as lower primary, secondary or tertiary alkylamines or cyclic amines, such as morpholine, and hydroxides, such as alkali metal hydroxides, ammonia being particularly preferably used. Advantageous performance characteristics are obtained if the total amount of the cations B is such that it is capable of neutralizing from 0.5 to 2 times the amount, corresponding to the amount of acid functions incorporated in the form of monomers II in the synthetic resin A, of their conjugated bases, neutralization of an equivalent amount being particularly preferred.

Not monoethylenically unsaturated acetophenone or benzophenone derivatives, component C, which have proven useful include compounds of the general formula XI

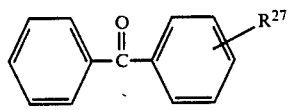

where $R^{27}$ is 4-$CH_3$, 4-OH, 4-$NH_2$, 4-Cl, 4-COOH, 4-$COOCH_3$, 2-COOH, 2-$COOCH_3$, 2-$NH_2$, 2-OH, 3-$NO_2$, 3-COOH or 3-$COOCH_3$. Preferred compounds XI are those in which $R^{27}$ is 4-$CH_3$, 4-OH, 4-$NH_2$, 4-Cl, 4-COOH or 4-$COOCH_3$. Compounds such as

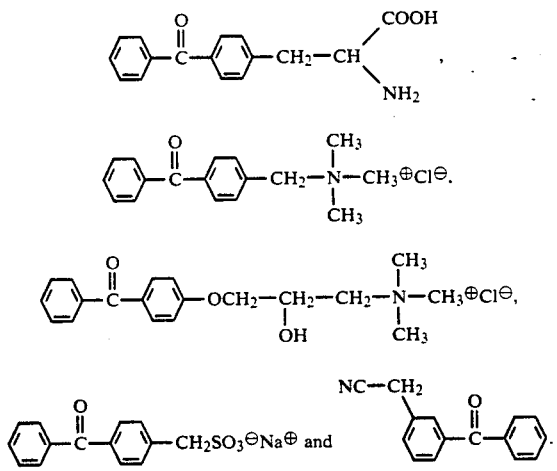

are also suitable.

These compounds are generally known and are obtainable from, for example, Shell Feinchemikalien, D-6236 Eschborn, Riedel de Haen AG, D-3016 Seelze 1, International Bio-Synthetics Ltd., GB-Halebank Widnes Cheshire WA8 8NS or Aldrich Chemie GmbH, D-7924 Steinheim, and others.

Benzophenone is particularly preferably used, mixtures which consist of benzophenone and suitable auxiliary substances and which are liquid at room temperature having particularly advantageous performance characteristics. Examples of such mixtures are 2,4,6-trimethylbenzophenone/benzophenone in a molar ratio of from 1.3:1 to 1.1 or 1-hydroxycyclohexyl phenyl ketone/benzophenone in a molar ratio of 1:1. Such mixtures are described in, inter alia, EP-A 209 831.

The component C is advantageously incorporated by stirring, preferably with heating, into an aqueous starting dispersion containing one or more synthetic resins A. However, the polymerization of monomers c in the synthetic resins A is preferable in terms of performance characteristics to the incorporation of components C into the novel synthetic resin formulations, since polymerization gives a more homogeneous distribution of the phenone compounds, which is essentially independent of external influences, such as temperature, and is essentially retained even during and after the novel aqueous synthetic resin formulations form a film.

Advantageously used components F of the novel synthetic resin formulation are aluminum silicates, quartz, precipitated or pyrogenic silica (which may be hydrophobic), gypsum, barite, talc, dolomite, calcium carbonate, barium sulfate, hornblende or wollastonite. Other suitable components F are color-imparting pigments. Preferably used white pigments are titanium white, lead white, zinc white, lithopone and antimony white, preferably used black pigments are iron oxide black, manganese black, cobalt black, antimony black and carbon black, and preferably used colored pigments are, for example, chrome yellow, red lead, zinc yellow, zinc green, zinc red, cadmium red, cobalt blue, Prussian blue, ultramarine, manganese violet, cadmium yellow, molybdate orange or strontium yellow.

The fillers are usually used in the form of fine particles. The mean particle size, as the arithmetic mean of the maximum diameter in each case, is preferably from 0.5 to 200 μm. However, the fillers may also be added in the form of granules having a mean particle size of from 0.1 to 10 mm, for example when the novel formulations are used as renders. Furthermore, fibrous materials, such as cellulose fibers, polyacrylonitrile fibers or staple polyamide fibers, may also be used as finely divided fillers. For the preparation of the novel aqueous synthetic resin formulations, fillers F are, as a rule, the last component to be stirred into synthetic resin dispersions already containment components A to E.

In addition, the novel formulations may contain minor amounts of conventional assistants, such as preservatives, eg. chloroacetamide or benzothiazolinone, antifoams, for example those based on esters of higher fatty acids, modified silicones or mineral oils, film-forming assistants, for example mineral spirit (bp. 180°-200° C.) or esters of glutaric, adipic and succinic acid with isobutanol, thickeners, for example those based on cellulose ethers, such as methylcelluloses, hydroxyethylcelluloses or methylhydroxypropylcelluloses, or those based on polyurethanes, pH-buffering and curing agents, such as the alkali metal salts of polyphosphoric acids, leveling agents, such as polyethylene wax dispersions or diglycol di-n-butyl ether, or pigment distributors, such as alkali metal or ammonium salts of polyacrylic acids, having a number average molecular weight $\overline{M}_n$ of about $2 \cdot 10^4$.

The pH of the prepared novel aqueous synthetic resin formulations is preferably from 6 to 12, the pH advantageously being adjusted using the same bases as those used for adjusting the pH of the starting dispersion containing one or more synthetic resins A, ie. preferably ammonia.

On the one hand, the surface tack of the novel aqueous synthetic resin formulations decreases to a greater extent during and after film formation, in particular under the action of actinic radiation, for example sunlight when used outdoors, which reduces the tendency to soil, and on the other hand the said formulations in the solidified state nevertheless simultaneously have high resilience. Remarkably, however, the novel formulations also exhibit a greater decrease in surface tack on film formation even in the absence of actinic radiation.

The fact that the resilience of the films obtainable merely by volatilization of the dispersing medium, in the absence of actinic radiation, further increases under the action of actinic radiation is also of interest.

Another essential feature of the novel formulations is that their resilience in the solidified state is essentially retained in the course of time under the conventional environmental influences, this being particularly applicable to formulations which contain colored pigments and the solidified coatings of which have essentially constant elongation at break. The films furthermore have high water resistance.

The novel formulations are therefore particularly suitable for coating, adhesive bonding, sealing or impregnating substrates of a very wide range of materials, such as textile fabrics, fiber glass fabrics and articles made of plastics, such as polyvinyl chloride, polyvinylidene chloride, polystyrene, polyacrylonitrile or cellulose acetate, or of glass, metal, concrete, asbestos cement, stone, sand, steel, leather, wood, ceramic or slate.

We have also found that the novel formulations are particularly suitable as coating materials for walls, floors and ceilings, as marking paints for paths and roads and as renders, the said formulations ensuring permanent covering of cracks.

EXAMPLES

In the examples which follow, percentages are by weight.

EXAMPLE 1

Demonstration of increased resilience and reduced surf tack of the novel synthetic resin formulations A monomer mixture of 71 g of n-butyl acrylate, 24 g of methyl methacrylate, 2.5 g of acrylonitrile and 2.5 g of acrylic acid was emulsified with 1.5 g of the Na salt of disulfonated dodecyldiphenyl oxide and 1 g of a mixture of ethoxylated $C_{12}$–$C_{14}$-alkanols (degree of ethoxylation 20) in 100 g of water.

Thereafter, 10% of an aqueous solution of 0.5 g of sodium peroxydisulfate in 10 g of water were added to 10% of the aqueous emulsion, and the mixture was heated to the emulsion polymerization temperature of 85° C. while stirring. Thereafter, while maintaining the polymerization temperature and stirring, the remaining amount of the aqueous emulsion was added continuously in the course of 2 hours and the remaining amount of the aqueous initiator solution was introduced continuously at the same time in the course of 2.25 hours, via separate feeds. After the end of the initiator addition, polymerization was continued for a further hour.

1 g of benzophenone was stirred into half (V1) of the resulting, about 50% strength aqueous synthetic resin dispersion, and 1 g of benzophenone and 4 g of an ammoniacal aqueous $[Zn(NH_3)_4](HCO_3)_2$ solution whose Zn content was 16% was stirred into the other half (B1). The two synthetic resin formulations were then applied to a glass sheet in a width of 8 mm and a length of 100 mm and in a thickness corresponding to a 0.5 mm thick dry layer, and the coating was dried for 24 hours (standard temperature and pressure conditions). Thereafter, the surface tack was tested by touching with the hand and was rated according to DIN 52,230 (0=best possible value, 5=poorest possible value). The results are shown in Table 1.

The films formed were then removed from the glass sheet and the modulus of elasticity ($E'[N/mm^2]$) was determined according to A. Zosel, Research on the Properties of cured films of aqueous dispersions of polymers, in Double Liaison-Chimie des Peintures, No. 384, October 1987, at −30° C. and 50° C. The results are likewise shown in Table 1. Film formation was then repeated and the resulting films were passed under a medium pressure mercury lamp (120 W/cm) at a speed of 1 m/min and at a distance of 15 cm, after which the surface tack and modulus of elasticity were determined as described. The results are shown in Table 1.

TABLE 1

|  |  | $E'$ (N/mm$^2$) | | Surface tack (rated according to DIN 53,230) |
|---|---|---|---|---|
|  |  | −30° C. | 50° C. |  |
| Without UV radiation | B1 | 2000 | 1.6 | 3.5 |
|  | V1 | 2000 | 0.42 | 5 |
| With UV radiation | B1 | 2300 | 1.8 | 1 |
|  | V1 | 2000 | 0.45 | 4 |

EXAMPLE 2

Investigation of novel coating formulations and renders, and comparative examples (a) Starting dispersions (their synthetic resin content was about 50% by weight in all cases)

D1: A mixture of 200 g of water, 15 g of feed 1, 10 g of feed 2 and 5 g of feed 3 was heated to the polymerization temperature of 45° C. and then, while maintaining the polymerization temperature and stirring, the remaining amount of feed 1 was added continuously in the course of 2 hours and the remaining amounts of feeds 2 and 3 were introduced continuously at the same time in the course of 2.25 hours, via feeds located in different places. After the end of the addition, polymerization was continued for 1 hour, after which 2.5 g of benzophenone was stirred in while heating at 60° C. and then 48 g of an ammoniacal aqueous zinc salt solution was stirred in after cooling to room temperature.

Feed 1

Aqueous emulsion of 250 g of n-butyl acrylate, 175 g of ethylhexyl acrylate, 75 g of styrene, 15 g of acrylic acid, 6.25 g of acrylamide (as 50% strength aqueous solution), 7.5 g of emulsifier I, ie. a mixture of sodium dodecylsulfate and sodium tetradecylsulfate (as a 20% strength aqueous solution), 6.2 g of emulsifier II, ie. a mixture of ethoxylated $C_{12}$–$C_{14}$-alkanols having a degree of ethoxylation of 22 (as a 20% strength aqueous solution) and 137 g of water.

Feed 2

Solution of 3.6 g of tert-butyl hydroperoxide in 100 g of water

Feed 3

Solution of 1.5 g of the Na salt of hydroxymethanesulfinic acid in 40 g of water

Zinc salt solution 11 g of zinc oxide and 11 g of ammonium bicarbonate dissolved in 28 g of a 25% strength ammonia solution
VD1: As for D1, but without benzophenone D2: As for D1, but without including a feed 3; the polymerization temperature was 85° C., no benzophenone was stirred in and feeds 1 and 2 had the following compositions:

Feed 1

Aqueous emulsion of 225 g of n-butyl acrylate, 185 g of 2-ethylhexyl acrylate, 90 g of styrene, 15 g of acrylic acid, 6.25 g of acrylamide (as a 50% strength aqueous solution), 2.5 g of α,β-acryloylbutene-(4,4'-benzoylphenyl)-carbonate, 6.25 g of emulsifier III, ie. ethoxylated tert-octylphenol having a degree of ethoxylation of 25 (as a 20% strength aqueous solution) and 199 g of water.

Feed 2

Solution of 2.5 g of sodium peroxydisulfate in 100 g of water
D3: As for D1, but without including a feed 3. 5 g of benzophenone were incorporated, the polymerization temperature was 85° C. and feeds 1 and 2 had the following compositions:

Feed 1

Aqueous emulsion of 225 g of n-butyl acrylate, 185 g of 2-ethylhexyl acrylate, 90 g of stryene, 6.25 g of acrylamide (as a 50% strength aqueous solution), 15 g of acrylic acid, 10 g of tetrahydrofurfur-2-yl acrylate, 7.5 g of emulsifier I, 6.2 g of emulsifier II and 186 g of water.

Feed 2

As for D2
VD2: As for D3, but without benzophenone
D4: As for D3, but feed 1 had the following composition:

Feed 1

Aqueous emulsion of 415 g of 2-ethylhexyl acrylate, 60 g of methyl methacrylate, 25 g of stryene, 5 g of acrylic acid, 7.5 g of emulsifier I, 6.2 g of emulsifier II and 161 g of water.
D5: As for D1, except that a mixture of 200 g of water, 30 g of feed 1 and 5 g of feed 3 were initially taken and polymerized at 85° C., the remaining feed 1 was added in the course of 1.25 hours, feed 2 in the course of 0.45 hour and the remaining feed 3 in the course of 2.25 hours, and 5 g of benzophenone and 10 g of zinc salt solution was stirred in. The feeds had the following compositions:

Feed 1

Emulsion of 227.5 g of n-butyl acrylate, 10 g of acrylic acid, 65 g of methyl methacrylate, 0.8 g of emulsifier I (as a 40% strength aqueous solution), 4 g of emulsifier III (as a 20% strength aqueous solution), 0.8 g of emulsifier IV, ie. Na salt of sulfated ethoxylated tert-octylphenol having a degree of ethoxylation of 25 (as a 35% strength aqueous solution) and 108 g of water.

Feed 2

78.7 g of n-butyl acrylate, 63.2 g of methyl methacrylate, 50.0 g of styrene, 25.6 g of 1-(methacryloyloxyethyl)-imidazolidine-2-one as a 39% strength solution in methyl methacrylate, 0.4 g of emulsifier I (as a 40% strength aqueous solution), 2.2 g of emulsifier III (as a 25% strength aqueous solution), 0.4 g of emulsifier IV (as a 35% strength aqueous solution), 15 g of butene-1,4-diol, 25 g of a 5% strength aqueous solution of a hydroxyethylcellulose and 76 g of water.

Feed 3

As for feed 2 in the case of D2
D6: As for D1, but without including a feed 3. The polymerization temperature was 85° C., 5 g of benzophenone and 15 g of zinc salt solution was stirred in, 15 g of a 25% strength aqueous ammonia solution were added in addition to the zinc salt solution, and feeds 1 and 2 had the following compositions:

Feed 1

Emulsion of 240 g of styrene, 210 g of n-butyl acrylate, 50 g of 2-ethylhexyl acrylate, 9 g of acrylic acid, 6 g of acrylamide (as a 50% strength aqueous solution), 7.5 g of emulsifier IV (as a 20% strength aqueous solution), 7.5 g of emulsifier III (as a 20% strength aqueous solution) and 166 g of water.

Feed 2

As for D2
VD3: As for D6 but without benzophenone (b) Surface tack and time-dependent behavior of the elongation at break of masonry paints Masonry paints having the following general composition were produced using the starting dispersions D1 to D3 and VD1 and VD2:
130 g of starting dispersion,
0.15 g of tetrasodium pyrophosphate (as a 25% strength aqueous solution),
0.6 g of chloroacetamide,
0.4 g of a 25% strength aqueous ammonia solution,
0.8 g of a silicone-based antifoam,
7 g of water,
0.4 g of the ammonium salt of a polyacrylic acid having an $\overline{M}_n$ of $2 \cdot 10^4$,
7 g of titanium white (mean particle size 1 μm),
8 g of talc (mean particle size 5 μm),
40 g of calcium carbonate (mean particle size 5 μm),
1 g of silica (mean particle size 1 μm),
2 g of mineral spirit (bp. 180° C.) and
1.6 g of a mixture of esters of adipic, glutaric and succinic acid with isopropanol.

First, 300 g/m² of each of the masonry paints were applied to a fiber cement panel and dried for 6 hours at standard temperature and pressure. Thereafter, the coating procedure was repeated using the same amount, the coat was dried for 24 hours at standard temperature and pressure and the surface tack of the coatings was then checked by touching and was rated according to DIN 53,230.

The coated fiber cement panels were then exposed to sunlight for 1 week at an angle of 45° facing south, and the surface tack test was repeated. The results are shown in Table 2. Furthermore, films produced from the masonry paints containing the starting dispersions D1 to D3 were dried for 24 hours under standard conditions of temperature and pressure, and the elongation at break (%) of these films was determined according to DIN 53,455 at −10° C. This test was repeated using films which had furthermore been exposed for 3 weeks to outdoor weathering. The results are likewise shown in Table 2.

TABLE 2

| | Starting dispersions | | | | |
|---|---|---|---|---|---|
| | D1 | VD1 | D2 | D3 | VD2 |
| Surface tack after 24 h | 1 | 2 | 1 | 1 | 2 |
| Surface tack after exposure to sun for 1 week | 0 | 2 | 0.5 | 0 | 2 |
| Elongation at break (−10° C.) after 24 h [%] | 70 | | 80 | 70 | |
| Elongation at break (−10° C.) after outdoor weathering for 3 weeks [%] | 63 | | 74 | 65 | |

(c) Time-dependent behavior of the elongation at break of a flat roof coating

Starting dispersion D4 was used to prepare the following formulation for flat roof coating:
55.5 g of D4
3.5 g of titanium white (mean particle size 1 μm),
27.7 g of calcium carbonate (mean particle size 5 μm),
10.4 g of barium sulfate (mean particle size 1 μm),
1.5 g of a 5% strength polyurethane thickener solution and
1.4 g of an antifoam based on a stearic ester The formulation was converted into a film as described under b) and the elongation at break of the film was determined. The results are shown in Table 3.

TABLE 3

| | |
|---|---|
| Elongation at break (−10° C.) after 24 h [%] | 180 |
| Elongation at break (−10° C.) after outdoor weathering for 3 weeks [%] | 165 |

(d) Time-dependent behavior of the elongation at break of a white house paint for wood Starting dispersion D5 was used to prepare the following while house paint for wood:
563 g of D5,
72 g of water,
1.5 g of tetrasodium pyrophosphate (as a 10% strength aqueous solution),
1.2 g of the ammonium salt of a polyacrylic acid having an $\overline{M}_n$ of $2 \cdot 10^4$,
5 g of mineral spirit (bp. 180° C.),
2 g of chloroacetamide,
1 g of a 5% strength aqueous solution of hydroxyethylcellulose,
7 g of a silicone-based antifoam,
24 g of talc (mean particle size 5 μm),
116 g of calcium carbonate (mean particle size 5 μm),
173 g of titanium white (mean particle size 1 μm),
0.7 g of a 25% strength aqueous ammonia solution
6.7 g of a 35% strength polyurethane thickener solution and
13.4 g of diglycol di-n-butyl ether The formulation was converted into a film as described under b) and the elongation at break of the film was determined. The result is shown in Table 4.

TABLE 4

| | |
|---|---|
| Elongation at break (−10° C.) after 24 h [%] | 100 |
| Elongation at break (−10° C.) after outdoor weathering for 3 weeks [%] | 95 |

(e) Surface tack of plasters

Starting dispersions D6 and VD3 were used to prepare the following formulation as a plaster:

170 g of starting dispersion,
21 g of a 3% strength aqueous solution of methylhydroxypropylcellulose,
2.5 g of tetrapotassium pyrophosphate (as a 50% strength aqueous solution),
3 g of a polyethylene wax dispersion,
4 g of an antifoam based on mineral oil,
2 g of benzothiazolinone,
20 g of mineral spirit (bp. 180° C.),
20 g of a mixture of esters of adipic, glutaric and succinic acid with isopropanol,
32 g of titanium white (mean particle size 1 μm),
267 g of calcium carbonate (mean particle size 40 μm),
77 g of calcium carbonate (mean particle size 130 μm),
79 g of aluminum silicate (mean particle size 5 μm) and
300 g of calcium carbonate granules (mean particle size 3 μm).

Thereafter, the plaster was applied to a fiber cement panel and dried as described in b), and the surface tack was determined. The results are shown in Table 5.

TABLE 5

| | Starting dispersion | |
|---|---|---|
| | D6 | VD3 |
| Surface tack after exposure to sun for 1 week | 1 | 3 |

We claim:
1. An aqueous synthetic resin formulation, essentially containing
   A) from 3 to 75% by weight of one or more synthetic resins which are composed of
      a) from 50 to 99.9% by weight of one or more esters of α,β-monoethylenically unsaturated carboxylic acids of 3 to 6 carbon atoms and alkanols of 1 to 18 carbon atoms or one or more vinyl esters of an aliphatic monocarboxylic acid of 2 to 8 carbon atoms or a mixture of these monomers (monomers a),
      b) from 0.1 to 12% by weight of one or more α,β-monoethylenically unsaturated monobasic or dibasic acids of 3 to 8 carbon atoms, of their anhydrides, or of half-esters of said α,β-monoethylenically unsaturated dicarboxylic acids with alkanols of 1 to 10 carbon atoms, or of a mixture of these monomers (monomers b),
      c) from 0 to 10% by weight of one or more monoethylenically unsaturated acetophenone or benzophenone derivatives or a mixture of these monomers (monomers c) and
      d) from 0 to 35% by weight of one or more other copolymerizable monoethylenically unsaturated monomers (monomers d), in polymerized form,
      the weights of monomers a, b and d being chosen within the stated limits in such a way that a synthetic resin consisting only of these monomers would have a glass transition temperature of from 40° to −50° C.,
   B) one or more cations having a charge of from 2 to 4, in water-soluble form,
   C) from 0 to 10% by weight, based on the synthetic resin A, of benzophenone or acetophenone or of one or more acetophenone or benzophenone derivatives which are not monoethylenically unsaturated or of a mixture of these active ingredients,
   D) effective amounts of emulsifiers or protective colloids or a mixture of these active ingredients,
   E) not less than 5% by weight of water and

F) from 0 to 85% by weight of finely divided fillers, with the proviso that the total amount of the monomers c and of component C is from 0.05% to 10% by weight, based on the synthetic resin A, and the total amount of the cations B is such that it is capable of neutralizing from 0.2 to 6 times the amount, corresponding to the amount of acid functions incorporated in the form of the monomers b in the synthetic resin A, of their conjugated bases.

2. A synthetic resin formulation as claimed in claim 1, whose synthetic resin A contains, as polymerized monomers b, α,β-monoethylenically unsaturated mono- or dicarboxylic acids, their anhydrides or a mixture of these monomers.

3. A synthetic resin formulation as claimed in claim 1, whose synthetic resin A contains, as polymerized monomers c, one or more of the compounds

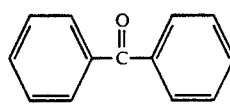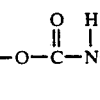—O—C(=O)—N(H)—CH$_2$—CH$_2$—O—CH$_2$—CH$_2$—O—C(=O)—C(CH$_3$)=CH$_2$ or

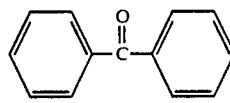—O—C(=O)—O—CH$_2$—CH$_2$—CH$_2$—CH$_2$—O—C(=O)—C(H)=CH$_2$.

4. A synthetic resin formulation as claimed in claim 1, whose synthetic resin A contains the monomers a, b and d polymerized in amounts such that a synthetic resin composed only of the monomers a, b and d would have a glass transition temperature of from −30 to −10° C.

5. A synthetic resin formulation as claimed in claim 1, which contains Zn$^{2+}$ as the metal cation.

6. A synthetic resin formulation as claimed in claim 1, which contains, as the metal cation, Zn$^{2+}$ in the form of an ammoniacal aqueous Zn(II) ammonium bicarbonate solution.

7. A synthetic resin formulation as claimed in claim 1, which contains benzophenone as component C.

8. A synthetic resin formulation as claimed in claim 1, which contains, as component D, a compound of the formula X

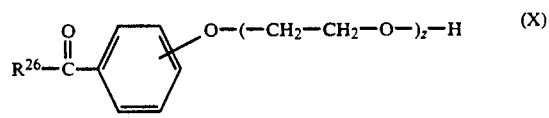

where z is from 1 to 200 and R$^{26}$ is —CH$_3$ or —C$_6$H$_5$ or is phenyl which is substituted by straight-chain or branched alkyl of 1 to 18 carbon atoms.

9. A process for the preparation of a synthetic resin formulation as claimed in claim 1, wherein the monomers a to d are subjected to free radical polymerization in aqueous emulsion in the presence of emulsifiers D, and the components B, C and F are incorporated in the synthetic resin dispersion obtainable in this manner.

* * * * *